United States Patent [19]

Wright et al.

[11] Patent Number: 4,692,473

[45] Date of Patent: Sep. 8, 1987

[54] WATER BORNE POLYMER FOAMABLE COMPOSITION

[75] Inventors: Thomas C. Wright; Grover L. Johnson, both of Arlington, Tex.

[73] Assignee: Orin Chemical Company, Arlington, Tex.

[21] Appl. No.: 727,497

[22] Filed: Apr. 26, 1985

[51] Int. Cl.$^4$ .............................................. C08J 9/30
[52] U.S. Cl. .................... 521/72; 428/314.4; 428/318.4; 428/514; 521/65; 521/84.1; 521/91; 521/92; 521/93; 521/141; 521/149
[58] Field of Search ............... 428/314.4, 318.4, 514; 521/82, 84.1, 85, 91, 92, 94, 134, 145, 149, 65, 72, 141

[56] References Cited

U.S. PATENT DOCUMENTS

| | | | |
|---|---|---|---|
| 2,200,473 | 5/1940 | Hardman | 521/92 |
| 2,386,995 | 10/1945 | Wigal | 521/73 |
| 3,062,698 | 11/1962 | Aykanian | 428/318.4 |
| 3,200,176 | 8/1965 | Baxter | 264/54 |
| 3,415,714 | 12/1968 | Hider | 428/318.4 |
| 3,634,564 | 1/1972 | Okamoto et al. | 264/54 |
| 3,655,542 | 4/1972 | Tamai et al. | 521/79 |
| 3,657,166 | 4/1972 | Caldwell | 521/97 |
| 3,808,300 | 4/1974 | Miyamoto et al. | 521/97 |
| 3,962,154 | 6/1976 | Elgi | 521/79 |
| 4,203,815 | 5/1980 | Noda et al. | 521/79 |

*Primary Examiner*—Morton Foelak
*Attorney, Agent, or Firm*—Bernard L. Kleinke

[57] ABSTRACT

A foam polyvinyl product prepared from a composition comprising a vinyl polymer and an alkali carbonate foaming agent.

8 Claims, No Drawings

WATER BORNE POLYMER FOAMABLE COMPOSITION

TECHNICAL FIELD

The present invention relates in general to a water borne polymer foamable composition. It more particularly relates to such a composition which is a multiple part, foamable composition, and which has many applications, including, but not limited to, light-weight loose-fill or molded packing materials, insulating construction materials for buildings, aerosol sprayable water-based paints or coatings, as well as adhesives.

BACKGROUND ART

Polystyrene and polyurethane are the present front runners for preparing foamed products. However, these have many inherent disadvantages, i.e. high flammability, very little structural strength for self-support and for supporting fastening materials such as nails and screws.

Polyvinyl acetate polymer foamed products are known. However, these products are not readily found in the market place. The compositions of the prior art as disclosed in U.S. Pat. No. 2,930,770 do not satisfy the needs of the market place.

Our present invention provides a multipart composition which permits the effective use of polyvinyl polymers for foamed products. The polyvinyl polymers used in the present invention are always water-borne. The polyvinyl polymers of the present invention are those polymers and copolymers of polyvinyl acetate, acrylate, maleate and phthalate and also polyvinyl chloride and polyvinyl acetate-ethylene copolymers.

The preferred polymers used in the present invention are water emulsions of polyvinyl acetate and polyvinyl acetateethylene. These are usually used separately but may be mixed if desired. These chemical polymers are readily available and the polymers we used to illustrate our invention were Airflex 400, Airflex 300, Vinac 240 and Airflex 400H, which were purchased from Air Products and Chemicals, Inc. of Allentown, PA.

Airflex 400 and Airflex 400H are a water-based vinyl acetateethylene copolymer emulsion, which is 55% solids (Cenco Moisture Balance). The viscosity is 1400–1600 cps at 60 rpm (Brookfield Viscometer, Model LVF at 60 rpm and 77° F.). The viscosity is 1900–2800 cps at 20 rpm (Brookfield Viscometer, Model RVF at 20 rpm and 77° F.). The pH is 4.0–5.0. The residual monomer is 0.5% maximum. The copolymer type is vinyl acetate-ethylene. The protective colloid is partially acetylated polyvinyl alcohol. The density is 8.9 lbs. per gal.

Airflex 300 is similar to Airflex 400, except that the viscosity at 60 rpm is 1700 cps, and at 20 rpm is 2400 cps, and except that the density is 9.0 lbs. per gal.

Vinac 240 is similar to Airflex 400, except that the viscosity is 2700–3400 cps at 20–60 rpm, the pH is 4.5–6.0. Also, the polymer type is homopolymer, and the density is 8.9–9.2 lbs. per gal.

Also utilized were polyvinyl acetate water borne emulsions; namely, homopolymer adhesive base (standard), experimental 6-97 (homopolymer), experimental 6-124 (copolymer) and experimental 6-239 (copolymer). They were all purchased from Borden Chemical of St. Louis, MO.

The homopolymer adhesive base is a commercially available product, and the others are available for experimental purposes.

The commercially available adhesive base is 45% solids, and has a viscosity of 3500 cps at 60 rpm at 25° C. The pH is 4.0–5.0. It is a homopolymer and has a density of 9.0.

The 6-97 homopolymer is 54% solids and has a viscosity of 3200 cps at 60 rpm at 25° C. The pH is 4.0–5.0. the density is 9.0.

The 6-124 copolymer (blend) is 50% solids, and has a viscosity of 3500 cps at 60 rpm at 25° C. The pH is 4.0–5.0 and has a density of 9.0.

The 6-239 copolymer (blend) is 58% solids and has a density of 9.1. The viscosity is 4000 cps and 60 rpm at 25° C. and the Ph is 4.0–5.0.

In the four Borden Chemical polymers, the protective colloid is polyvinylalcohol.

As a blowing agent, we utilize natural and generally non-toxic blowing agents to provide a safe environment for foaming our products. The blowing agent we utilize is carbon dioxide. However, we obtain the carbon dioxide by reacting carbonates and bicarbonates with an appropriate acid. Further, as required by our invention, we use an alkali cross-linking agent. The preferred alkali compounds are Na, K, Li, Rb and Cs, although Mg, Ca, Sr, Ba and Zn can also be used. To effectively obtain both the alkali cross-linking agent and the blowing agent, we use the alkali carbonates and bicarbonates. The most common and readily available are ammonium bicarbonate, potassium bicarbonate, sodium bicarbonate, magnesium carbonate, calcium carbonate and zinc carbonate. Our preferred foaming agent is sodium bicarbonate.

Our invention requires our foam composition to also include and acid to release the carbon dioxide. However, in some cases the use of sodium bicarbonate alone is sufficient to release both the carbon dioxide blowing agent and to provide the alkali action as a cross-linking agent. The use of a cross-linking agent allows the foam product produced by our invention to have greater structural integrity than the foam products of the prior art. Our preferred acids are selected from citric acid, acetic acid, tartaric acid, hydrochloric acid and oleic acid. Of course mixtures of the acids and acid salts may be used. Our preferred salts are alkali bitartarates, monobasic calcium phosphate and monobasic sodium phosphate. Our preferred acid and acid salt are citric acid and potassium bitartarate, these both being readily available and, again, being non-toxic and thus environmentally safe for both the workers and the environment in the production of our foam products.

In addition to the above required compounds, other compounds may be utilized depending upon the end product to be produced. Those compounds which may be used may be suitable thickners, plastisizers, protective colloids, adhesives and various dyes. We have utilized and shown various additives such as carboxymethyl cellose, casein, polyvinyl alcohol, polyethylene glycol, starch, wheat gluten, dibutylphthalate, boric acid, gypsum, limestone, vermiculite, wood chips, popcorn chips and granules of popcorn.

The products produced by our invention show excellent flame resistance and stability. Wallboard produced with our composition had kraft paper on one side thereof. The wallboard may be used as a substitute for the present plaster board used in present wall construction. The wallboard produced by our intention allows screws to be screwed directly into the wallboard without the necessity of an anchor. Also, our wallboard has the same integrity as wood. That is, it will hold a nail in the same fashion that wood holds a nail. This, of course, is superior to the plaster board which is presently used in most construction. Further, our wallboard not only acts as a structural material, but also provides insulation and sound-proofing, which cannot be provided by plaster board.

Also, our composition can be used as a material, water based paint or coating, and an adhesive. The packing material is light weight and flame resistant, and thus has an advantage over known polystyrene packing materials.

Our paint or coating provides flame resistance and insulation.

The following examples more fully illustrate the invention, but it is not intended that the invention be limited to the exact procedures or concentrations utilized. Rather, it is intended that all equivalents obvious to those skilled in the art be included within the scope of the invention.

In all of the following examples the acid and carbonate blowing agent are added separately. Preferably, the acid is first combined with polyvinyl emulsion. However, the manner in which the compositions are mixed is not important. They are mixed and agitated to cause the reaction to release the alkali cross linking action and the carbon dioxide blowing agent. When the acid, acid salt, and carbonate are solids they may be premixed and added as a unit. Also they may be suspended in a water miscible non-ionic liquid and added to the emulsion as a liquid.

The following Examples 13 through 28 use Borden's experimental 6-97 emulsion; Examples 29 through 32 use Borden's homopolymer adhesive base (standard) emulsion; Examples 36 through 52 use Air Products Airflex 400 emulsion.

As used in the examples PVA is polyvinyl acetate; $H_3Ct$ is citric acid; KH Tar is potassium bitartrate; HAc is acetic acid and CMC is carboxymethyl cellulose.

In the following examples, it will be noted that by varying the formulation of the ingredients, various different properties of the resulting product can be emphasized. In this regard, density, structural strength, flame resistance and flexibility are the basic properties that are determined by the specific formuations of our composition.

In order to control the density, a low density is achieved by increasing the amount of the blowing agent. In this regard, an increase in the acid/carbonate ratio causes a decrease in the density correspondingly. For a higher density, the amount of the blowing agent is decreased, or the carbonates are increased.

Concerning the structural strength of the resulting product, in general, the higher density materials have better tensile and shear properties.

The flame resistance of the resulting product is better in the higher density resulting materials. In the higher density materials, increased carbonates cause better cross-linking and a better cell structure to occur, and thus the flame resistance is better.

Better flexibility is exhibited in the less dense resulting material. Also, for better flexibility, copolymers, plasticizers and CMC are used variously in the formulations. They are air dryed at room temperature. The more flexible materials may be used for packaging, due to the better cushioning properties.

EXAMPLE 1

100 parts by weight emulsion
7 parts by weight $NaHCO_3$
1 parts by weight $H_3Ct$.

The resulting material exhibits dense structural properties and possesses excellent flame resistance. It also readily achieves cross-linking.

EXAMPLE 2

100 parts by weight emulsion
3 parts by weight $NaHCO_3$
6 parts by weight KH tartrate.

The resulting material of the present example is similar to that of Example 1, except that, due to the different blowing agent employed, an even stronger and more dense material results.

EXAMPLE 3

100 parts by weight emulsion (PVA)
2.5 parts by weight citric acid ($H_3Ct$)
10 parts by weight sodium bicarbonate ($NaHCO_3$).

This example is a general purpose material, and exhibits good insulating and packaging properties. It is a homopolymer of medium density, and has good flame resistance.

EXAMPLE 4

100 parts by weight emulsion (PVA-Et)
2.5 parts by weight $H_3Ct$
10 parts by weight $NaHCO_3$.

The present example results in a general purpose material, which is especially well suited for packaging and has good flexibility. This is an example of a copolymer used with the same blowing agent of Example 3.

EXAMPLE 5

100 parts by weight emulsion (PVA)
5 parts by weight KH Tar
10 parts by weight $NaHCO_3$.

The present example is similar to Exhibit 4, except that a different acid is employed. The resulting material is a general purpose material of medium density. It exhibits good flame resistance and flexibility.

EXAMPLE 6

100 parts by weight emulsion (PVA)
5 parts by weight acetic acid (HAc)
5 parts by weight $NaHCO_3$.

The composition in this example exhibits good insulating properties and is flame resistant.

EXAMPLE 7

100 parts by weight emulsion (PVA)
5 parts by weight $Ca(H_2PO_2)_2$
5 parts by weight $NaHCO_3$.

This example is similar to Example 6, except that a different acid is employed. The resulting properties are similar.

EXAMPLE 8

100 parts by weight emulsion (PVA)
5 parts by weight HCl (6M)
10 parts by weight $NaHCO_3$.

The present example is similar to Example 5, except that a different acid is employed with similar resulting properties.

EXAMPLE 9

100 parts by weight emulsion (PVA)
3 parts by weight H$_3$Ct
10 parts by weight KH Tar
20 parts by weight NH$_4$HCO$_3$.

The present composition includes a blend of acids, and is a foamy material due to a large amount of blowing agent. It has good insulating properties and low density.

EXAMPLE 10

100 parts by weight emulsion (PVA)
3 parts by weight H$_3$Ct
10 parts by weight KH Tar
20 parts by weight MgCO$_3$.

The composition of this example includes a mixture of acids, and is a foamy, low density material. It is a retarded foaming compound, and thus is well suited for foaming in place due to he slower rate of curing.

EXAMPLE 11

100 parts by weight emulsion (PVA)
3 parts by weight H$_3$Ct
10 parts by weight KH Tar
20 parts by weight ZnCO$_3$.

This example is similar to Example 11, in that it is a retarded foaming compound, except that the cure rate is not quite as slow.

EXAMPLE 12

100 parts by weight emulsion (PVA)
10 parts by weight casein
5 parts by weight HAc
8 parts by weight NaHCO$_3$.

This formulation has better structural properties, is medium density and has good flame resistance.

EXAMPLE 13

100 parts by weight emulsion (PVA homopolymer)
10 parts by weight NaHCO$_3$.

This example is the simplest formulation, in that it has two ingredients only. It is a dense, low foaming composition, which has good structural properties. It is flame resistant.

The following Examples 14 through 21 are similar to one another and have varying acid/carbonate ratios for a constant amount of blowing agent. For Examples 14 through 21, the density decreases progressively from a structural formulation (Exhibit 14) progressively to a foamy insulating formulation (Exhibit 21).

EXAMPLE 14

100 parts by weight emulsion (PVA homopolymer)
0.5 parts by weight citric acid
9.5 parts by weight NaHCO$_3$.

EXAMPLE 15

100 parts by weight emulsion (PVA homopolymer)
1 parts by weight citric acid
9 parts by weight NaHCO$_3$.

EXAMPLE 16

100 parts by weight emulsion (PVA homopolymer)
2 parts by weight citric acid
8 parts by weight NaHCO$_3$.

EXAMPLE 17

100 parts by weight emulsion (PVA homopolymer)
4 parts by weight citric acid
6 parts by weight NaHCO$_3$.

EXAMPLE 18

100 parts by weight emulsion (PVA homopolymer)
5 parts by weight citric acid
5 parts by weight NaHCO$_3$.

EXAMPLE 19

100 parts by weight emulsion (PVA homopolymer)
6 parts by weight citric acid
4 parts by weight NaHCO$_3$.

EXAMPLE 20

100 parts by weight emulsion (PVA homopolymer)
8 parts by weight citric acid
2 parts by weight NaHCO$_3$.

EXAMPLE 21

100 parts by weight emulsion (PVA homopolymer)
9 parts by weight citric acid
1 parts by weight NaHCO$_3$.

The following Examples 21 through 28 also are similar to one another and are similar to the set of Examples 14 through 21, by having varying acid/carbonate ratios for a constant amount of blowing agent. The difference between the two sets of examples is the use of a different acid, but the results are similar.

EXAMPLE 22

100 parts by weight emulsion (PVA homopolymer)
1 parts by weight KH tartrate
9 parts by weight NaHCO$_3$.

EXAMPLE 23

100 parts by weight emulsion (PVA homopolymer)
2 parts by weight KH tartrate
8 parts by weight NaHCO$_3$.

EXAMPLE 24

100 parts by weight emulsion (PVA homopolymer)
4 parts by weight KH tartrate
6 parts by weight NaHCO$_3$.

EXAMPLE 25

100 parts by weight emulsion (PVA homopolymer)
5 parts by weight KH tartrate
5 parts by weight NaHCO$_3$.

EXAMPLE 26

100 parts by weight emulsion (PVA homopolymer)
6 parts by weight KHT
4 parts by weight NaHCO$_3$.

EXAMPLE 27

100 parts by weight emulsion (PVA hompolymer)
8 parts by weight KHT
2 parts by weight NaHCO$_3$.

EXAMPLE 28

100 parts by weight emulsion (PVA homopolymer)
9 parts by weight KHT
1 parts by weight NaHCO$_3$.

EXAMPLE 29

100 parts by weight emulsion (PVA homopolymer)
10 parts by weight KHT
20 parts by weight NaHCO$_3$.

This composition includes a large amount of blowing agent and is a good insulator with good flame resistance.

EXAMPLE 30

100 parts by weight emulsion (PVA homopolymer)
5 parts by weight citric acid
10 parts by weight NaHCO$_3$.

This example is similar to Example 18, and exhibits somewhat higher density than Exhibit 29.

EXAMPLE 31

100 parts by weight emulsion (PVA homopolymer)
15 parts by weight HCL (6M)
10 parts by weight NaHCO$_3$.

This formulation has a large amount of acid, and is a low density foamy material.

EXAMPLE 32

100 parts by weight emulsion (PVA homopolymer)
25 parts by weight HCL (6M)
10 parts by weight NaHCO$_3$.

The present example is similar to Example 31, except that it is lighter density and more foamy.

In the following Examples 33 through 38, CMC is employed as an additive to provide better flexibility, by increasing the viscosity of the emulsion. Both high grade (high molecular weight—MW) and medium grade (medium molecular weight—MW) grades of CMC are used. Examples 33 through 38 exhibit good structural properties, and good flexibility. In general, with greater amounts of CMC, a larger amount of thickening of the composition results. At the beginning of the foaming process, the uncured foam is semi-rigid, and thus stays in place more readily during the foaming process due to the stability of the foam.

The first three non-carbonate ingredients can be premixed. Also, the emulsion is a copolymer for Examples 36 through 38, and results in even greater flexibility.

EXAMPLE 33

100 parts by weight emulsion (PVA)
0.3 parts by weight CMC (high MW)
5 parts by weight citric acid
10 parts by weight sodium bicarbonate.

EXAMPLE 34

100 parts by weight emulsion (PVA)
0.6 parts by weight CMC (medium MW)
5 parts by weight citric acid
10 parts by weight sodium bicarbonate.

EXAMPLE 35

100 parts by weight emulsion (PVA)
0.6 parts by weight CMC (medium MW)
5 parts by weight citric acid
10 parts by weight NaHCO$_3$.

EXAMPLE 36

100 parts by weight emulsion (PVA ethylene copolymer)
2 parts by weight CMC (medium MW)
5 parts by weight citric acid
10 parts by weight NaHCO$_3$.

EXAMPLE 37

100 parts by weight emulsion (PVA ethylene copolymer)
1 parts by weight CMC (medium MW)
5 parts by weight citric acid
10 parts by weight NaHCO$_3$.

EXAMPLE 38

100 parts by weight emulsion
1 parts by weight CMC (medium MW)
4 parts by weight citric acid
10 parts by weight NaHCO$_3$.

The following Examples 39-52 are copolymer emulsion formulations for excellent flexibility and packaging properties. Various additives are employed.

EXAMPLE 39

100 parts by weight emulsion (PVA ethylene copolymer)
1 parts by weight CMC (medium MW)
2 parts by weight vermiculite
5 parts by weight citric acid
10 parts by weight NaHCO$_3$.

This example employs CMC for greater flexibility and foam stability. The vermiculite is a spongy light weight substance to help make this composition low in density.

EXAMPLE 40

100 parts by weight emulsion (PVA ethylene copolymer).
3 parts by weight vermiculite
5 parts by weight citric acid
10 parts by weight NaHCO$_3$.

EXAMPLE 41

100 parts by weight emulsion (PVA ethylene copolymer
0.5 parts by weight CMC (high MW)
2 parts by weight vermiculite
5 parts by weight citric acid
10 parts by weight NaHCO$_3$.

This example includes a smaller quantity of CMC, and yet achieves the same results. Thus, a more efficient foam stabilization and flexibility is achieved.

EXAMPLE 42

100 parts by weight emulsion (PVA ethylene copolymer)
0.5 parts by weight CMC (high MW)
3 parts by weight vermiculite
5 parts by weight citric acid
10 parts by weight NaHCO$_3$.

This composition is similar to example 41, except that example 42 is less dense.

EXAMPLE 43

100 parts by weight emulsion (PVA ethylene copolymer)
0.5 parts by weight CMC (high MW)
5 parts by weight citric acid
3 parts by weight wood chips
10 parts by weight NaHCO$_3$.

The wood chips of this example serve as a filler for packaging properties. The composition has improved structure and good flame resistance.

The following Examples 44 through 48 include popcorn in its expanded (popped) form, and is granulated without destroying the fluffiness of the popcorn. The popcorn provides increased cushioning, and thus packaging properties. The compositions exhibit good flexibility and good flame resistance.

The blowing agents are varied. Examples 47 and 48 include CMC and casein as thickners.

The CMC is a foam stabilizer, and the casein increases the structural strength—both tensile and shear strengths.

EXAMPLE 44

100 parts by weight emulsion (PVA ethylene copolymer)
3 parts by weight popcorn (chips)
4 parts by weight citric acid
10 parts by weight $NaHCO_3$.

EXAMPLE 45

100 parts by weight emulsion (PVA ethylene copolymer)
5 parts by weight popcorn (granules)
7 parts by weight citric acid
10 parts by weight $NaHCO_3$.

EXAMPLE 46

100 parts by weight emulsion (PVA ethylene copolymer)
2 parts by weight popcorn (granules)
5 parts by weight citric acid
10 parts by weight $NaHCO_3$.

EXAMPLE 47

100 parts by weight emulsion (PVA ethylene copolymer)
3 parts by weight popcorn (granules)
1 parts by weight CMC (medium MW)
5 parts by weight citric acid
10 parts by weight $NaHCO_3$.

EXAMPLE 48

100 parts by weight emulsion (PVA ethylene copolymer)
3 parts by weight popcorn (granules)
3 parts by weight casein
5 parts by weight citric acid
10 parts by weight $NaHCO_3$.

EXAMPLE 49

100 parts by weight emulsion (PVA ethylene copolymer)
5 parts by weight vermiculite
4 parts by weight citric acid
10 parts by weight $NaHCO_3$.

This example includes a large amount of vermiculite, and thus is low density and good packaging properties.

EXAMPLE 50

100 parts by weight emulsion (PVA ethylene copolymer)
1 parts by weight CMC (medium MW)
3 parts by weight vermiculite
5 parts by weight citric acid
10 parts by weight $NaHCO_3$.

This composition includes CMC as a thickener, and thus is similar to Examples 41 and 42.

EXAMPLE 51

100 parts by weight emulsion (PVA ethylene copolymer)
3 parts by weight polyvinyl alcohol
5 parts by weight citric acid
10 parts by weight $NaHCO_3$.

The polyvinyl alcohol makes this composition more rigid and has good structural strength. It is water resistant, and thus is weather resistant and well suited for use in high humidity climates.

EXAMPLE 52

100 parts by weight emulsion (PVA ethylene copolymer)
1 parts by weight boric acid
5 parts by weight citric acid
10 parts by weight $NaHCO_3$.

By including boric acid in this formulation, rapid cross-linking occurs, and thus rapid curing takes place. The foaming is reduced, and thus is more dense.

Examples 53 through 55 that follow, employ different acids, and yet exhibit similar properties. Good structural strength and flame resistance are exhibited. Example 55 is more flexible and less dense.

EXAMPLE 53

100 parts by weight emulsion (Homopolymer adhesive base—standard)
2 parts by weight $Ca(H_2PO_4)_2$
6 parts by weight $NaHCO_3$.

EXAMPLE 54

100 parts by weight emulsion (Homopolymer adhesive base—standard)
1.5 parts by weight tartaric acid
6 parts by weight $NaHCO_3$.

EXAMPLE 55

100 parts by weight emulsion (Homopolymer adhesive base—standard)
5 parts by weight oleic acid
6 parts by weight $NaHCO_3$.

Following Example 56 and 57 are similar to the two-ingredient Example 13, except that different carbonates are employed. Example 57 is foamy and lighter in weight.

EXAMPLE 56

100 parts by weight emulsion (Homopolymer adhesive base—standard)
5 parts by weight $NH_4HCO_3$.

EXAMPLE 57

100 parts by weight emulsion (Homopolymer adhesive base—standard)
5 parts by weight $(NH_4)_2CO_3$.

EXAMPLE 58

100 parts by weight emulsion (Homopolymer adhesive base—standard)
1 parts by weight polyvinylalcohol
10 parts by weight KH tartrate
10 parts by weight $NaHCO_3$.

The present example is very foamy and light in weight. It is moisture resistant, due to the polyvinylalcohol, and is a good insulator.

EXAMPLE 59

100 parts by weight emulsion (Homopolymer adhesive base—standard)
1 parts by weight polyethylene glycol
10 parts by weight KH tartrate
3 parts by weight citric acid
20 parts by weight NaHCO$_3$.

This composition has good structural properties, and yet is light weight. It has a more rigid cured foam that dries quickly and retains its shape.

EXAMPLE 60

100 parts by weight emulsion (Homopolymer adhesive base—standard)
10 parts by weight polyethylene glycol
3 parts by weight citric acid
10 parts by weight KH tartrate
20 parts by weight NaHCO$_3$.

The present example is similar to Example 59, except that a larger amount of polyethylene glycol is employed to increase the properties with only a minor increase in weight.

EXAMPLE 61

100 parts by weight emulsion (Homopolymer adhesive base—standard)
5 parts by weight starch (corn)
3 parts by weight citric acid
10 parts by weight KH tartrate
20 parts by weight NaHCO$_3$.

The corn starch in the present example serves as a thickener, in a similar manner as CMC, but is less expensive, the resulting material is foamy and is flexible.

EXAMPLE 62

100 parts by weight emulsion (Homopolymer adhesive base—standard)
10 parts by weight KH tartrate
10 parts by weight NaHCO$_3$.

This formulation is a two-part liquid, which lends itself to be pumped and sprayed as a paint or a coating.

EXAMPLE 63

100 parts by weight emulsion (polyacrylic)
2 parts by weight citric acid
8 parts by weight NaHCO$_3$.

This example employs another type of emulsion—polyacrylic. The composition has hard structural properties, high density and good flame resistance.

EXAMPLE 64

50 parts by weight emulsion (Borden Experimental 6-97 homopolymer)
50 parts by weight emulsion (polyacrylic)
2 parts by weight citric acid
8 parts by weight NaHCO$_3$.

The present example is similar to Example 63, except that it is less dense. The emulsions are blended.

EXAMPLE 65

80 parts by weight emulsion (polyacrylic)
20 parts by weight emulsion (casein)
2 parts by weight citric acid
8 parts by weight NaHCO$_3$.

This example is more dense with excellent structural strength. It is hard, and impact resistant. It has good flame resistant properties. The casein possesses good structural strength itself. The emulsions are blended.

In the foregoing examples, the polyacrylic adds hardness properties to our formulation.

Other acids, such as Ca(H$_2$PO$_4$)$_2$ and NaH$_2$PO$_4$ may also be employed in place of the acids in the foregoing examples.

We claim:

1. A multi-part composition for preparing a foamed polyvinyl product wherein the compositions contains at least two separate parts which are to be mixed to prepare the foamed product in a manner known per se, said first part being a vinyl acetate polymer selected from the group consisting of vinyl acetate polymer and vinyl acetate-ethylene copolymers and the second part being selected from the group consisting of sodium bicarbonate and a carbonate foaming agent and wherein with said carbonate foaming agent there is included in one of or both of the first and second parts an acid compound selected from the group consisting of citric acid, acetic acid, tartaric acid, alkali citrate, alkali bitatrate, calcium phosphate, and mixtures thereof; and the carbonate is selected from the group consisting of sodium bicarbonate, magnesium carbonate, ammonium bicarbonate and zinc carbonate; and wherein the composition comprises:

100 parts by weight of a water based emulsion of said polymer;
2–15 parts by weight of sodium bicarbonate or said carbonate foaming agent and said acid compound;
0–25 parts by weight of cross-linking reagents;
0–20 parts by weight of filler;
0–5 parts by weight of thickners.

2. The composition of claim 1 wherein the composition has 100 parts by weight of a water based vinyl acetate polymer and one of the compositions selected from the group consisting of, wherein, the proportions indicated are parts by weight;
(a) 2.5 citric acid and 10. sodium bicarbonate;
(b) 0.5 citric acid and 9.5 sodium bicarbonate;
(c) 1.0 citric acid and 9.0 sodium bicarbonate;
(d) 2.0 citric acid and 8.0 sodium bicarbonate;
(e) 4.0 citric acid and 6.0 sodium bicarbonate;
(f) 5.0 citric acid and 5.0 sodium bicarbonate;
(g) 6.0 citric acid and 4.0 sodium bicarbonate;
(h) 8.0 citric acid and 2.0 sodium bicarbonate;
(i) 9.0 citric acid and 1.0 sodium bicarbonate;
(j) 5.0 citric acid and 10. sodium bicarbonate; and
(k) 10. sodium bicarbonate.

3. The composition of claim 1 wherein the composition has 100 parts by weight of a water based vinyl acetate polymer and one of the compositions selected from the group consisting of, wherein the proportions indicated are parts by weight,
(a) 1 potassium bitartrate and 9 sodium bicarbonate;
(b) 2 potassium bitartrate and 8 sodium bicarbonate;
(c) 4 potassium bitartrate and 6 sodium bicarbonate; and
(d) 5 potassium bitartrate and 5 sodium bicarbonate.

4. The composition of claim 1 wherein the composition has 100 parts by weight of a water based vinyl acetate polymer and one of the compositions selected from the group consisting of, wherein the proportions indicated are parts by weight,
(a) 5 sodium bicarbonate and 5 acetic acid;
(b) 5 sodium bicarbonate and 5 calcium phosphate;
(c) 10 sodium bicarbonate and 5 hydrochloric acid;
(d) 10 sodium bicarbonate and 15 hydrochloric acid; and (e) 10 sodium bicarbonate and 25 hydrochloric acid.

5. The composition of claim 1 wherein the composition has 100 parts by weight of a water based vinyl acetate polymer and one of the compositions selected from the group consisting of, wherein the proportions indicated are parts by weight,
   (a) 8 sodium bicarbonate, 5 acetic acid, 10 casein;
   (b) 10 sodium bicarbonate, 5 citric acid, 0.3 carboxymethyl cellulose; and
   (c) 10 sodium bicarbonate, 5 citric acid, 0.06 carboxymethyl cellulose.

6. The composition of claim 1 wherein the composition has 100 parts by weight of a water based vinyl acetate polymer and one of the compositions selected from the group consisting of, wherein the proportions indicated are parts by weight,
   (a) 20 ammonium bicarbonate, 10 potassium bitartrate, 3 citric acid;
   (b) 20 magnesium carbonate, 10 potassium bitartrate, 3 citric acid; and
   (c) 20 zinc carbonate, 10 potassium bitartrate, 3 citric acid.

7. The composition of claim 1 wherein the composition has 100 parts by weight of a water based vinylacetate-ethylene copolymer and one of the compositions selected from the group consisting of, wherein the proportions indicated are parts by weight,
   (a) 10 sodium bicarbonate, 2.5 citric acid;
   (b) 10 sodium bicarbonate, 5 citric acid, 2 vermiculite, 1 carboxylcellulose;
   (c) 10 sodium bicarbonate, 4 citric acid, 5 vermiculite;
   (d) 10 sodium bicarbonate, 5 citric acid, 3 vermiculite, 1 carboxymethyl cellulose;
   (e) 10 sodium bicarbonate, 5 citric acid, 2 vermiculite, 1 carboxymethyl cellulose;
   (f) 10 sodium bicarbonate, 5 citric acid, 2 vermiculite, 0.5 carboxymethyl cellulose;
   (g) 10 sodium bicarbonate, 5 citric acid, 3 vermiculite, 0.5 carboxymethyl cellulose;
   (h) 10 sodium bicarbonate, 5 citric acid, 3 wood chips, 0.5 carboxymethyl cellulose;
   (i) 10 sodium bicarbonate, 4 citric acid, 3 popcorn chips;
   (j) 10 sodium bicarbonate, 7 citric acid, 5 popcorn granules;
   (k) 10 sodium bicarbonate, 5 citric acid, 2 popcorn granules;
   (l) 10 sodium bicarbonate, 5 citric acid, 3 popcorn granules, 1 carboxymethyl cellulose;
   (m) 10 sodium bicarbonate, 5 citric acid, 3 popcorn granules, 3 casein;
   (n) 10 sodium bicarbonate, 5 citric acid, 5 polyvinyl alcohol; and
   (o) 10 sodium bicarbonate, 5 citric acid, 1 boric acid.

8. A water based paint composition comprising a polyvinyl polymer selected from the group consisting of polyvinyl acetate, vinyl acetate-ethylene and mixtures thereof; an acid compound selected from the group consisting of citric acid, hydrochloric acid, tartaric acid, alkali citrate, alkali bitartrate and mixtures thereof; and a carbonate selected from the group consisting of sodium bicarbonate, ammonium bicarbonate, magnesium carbonate and zinc carbonate.

* * * * *

UNITED STATES PATENT AND TRADEMARK OFFICE
CERTIFICATE OF CORRECTION

PATENT NO. : 4,692,473

DATED : September 8, 1987

INVENTOR(S) : Thomas C. Wright

It is certified that error appears in the above-identified patent and that said Letters Patent are hereby corrected as shown below:

Column 1, Line 38: "acetateethylene" should read --acetate-ethylene--.
Column 1, Line 46: "acetateethylene" should read --acetate-ethylene--.
Column 12, Line 13: "vinyl" should read --polyvinyl--.
Column 12, Line 14: "vinyl" should read --polyvinyl--.
Column 12, Line 34: "vinyl" should read --polyvinyl--.
Column 12, Line 60: "vinyl" should read --polyvinyl--.
Column 13, Line 3: "vinyl" should read --polyvinyl--.
Column 13, Line 14: "vinyl" should read --polyvinyl--.
Column 13, Line 26: "vinyl" should read --polyvinyl--.
Column 14, Line 26: "vinyl" should read --polyvinyl--.

Signed and Sealed this

Ninth Day of February, 1988

*Attest:*

DONALD J. QUIGG

*Attesting Officer*  *Commissioner of Patents and Trademarks*